United States Patent
Paradowski et al.

(10) Patent No.: US 10,744,447 B2
(45) Date of Patent: Aug. 18, 2020

(54) METHOD OF PROCESSING A FEED NATURAL GAS TO OBTAIN A PROCESSED NATURAL GAS AND A CUT OF C5+ HYDROCARBONS, AND ASSOCIATED INSTALLATION

(75) Inventors: Henri Paradowski, Pluvigner (FR); Sylvain Vovard, Courbevoie (FR)

(73) Assignee: TECHNIP FRANCE (FR)

(*) Notice: Subject to any disclaimer, the term of this patent is extended or adjusted under 35 U.S.C. 154(b) by 1430 days.

(21) Appl. No.: 12/731,549

(22) Filed: Mar. 25, 2010

(65) Prior Publication Data
US 2010/0242536 A1    Sep. 30, 2010

(30) Foreign Application Priority Data

Mar. 25, 2009   (FR) ...................................... 09 51941

(51) Int. Cl.
| | |
|---|---|
| F25J 3/02 | (2006.01) |
| B01D 53/00 | (2006.01) |
| C10L 3/10 | (2006.01) |
| C10G 5/06 | (2006.01) |

(52) U.S. Cl.
CPC ............ B01D 53/002 (2013.01); C10G 5/06 (2013.01); C10L 3/10 (2013.01); F25J 3/0209 (2013.01); F25J 3/0238 (2013.01); F25J 3/0242 (2013.01); B01D 2256/24 (2013.01); B01D 2257/702 (2013.01); C10G 2300/1025 (2013.01); C10G 2300/4012 (2013.01)

(58) Field of Classification Search
CPC ........ F25J 3/0235; F25J 3/0238; F25J 3/0242; F25J 3/0247; F25J 3/0209; F25J 3/0214

USPC .................. 62/620, 621, 622, 617, 618, 630
See application file for complete search history.

(56) References Cited

U.S. PATENT DOCUMENTS

| | | | | | |
|---|---|---|---|---|---|
| 3,405,530 | A | * | 10/1968 | Denahan .................... | F17C 9/04 208/351 |
| 4,012,212 | A | * | 3/1977 | Kniel ...................... | F25J 1/0022 62/621 |
| 4,604,117 | A | * | 8/1986 | Cheung .......................... | 62/646 |
| RE33,408 | E | * | 10/1990 | Khan et al. ..................... | 62/621 |
| 7,041,156 | B2 | * | 5/2006 | Bras ...................... | B01D 53/14 62/632 |
| 2001/0008073 | A1 | * | 7/2001 | Finn ........................ | C07C 7/005 62/621 |

(Continued)

FOREIGN PATENT DOCUMENTS

| | | | |
|---|---|---|---|
| WO | WO 2007138067 A2 | * 12/2007 | |
| WO | WO 2007144395 A2 | * 12/2007 | ............... C10G 5/06 |

*Primary Examiner* — Brian M King
(74) *Attorney, Agent, or Firm* — Ostrolenk Faber LLP

(57) ABSTRACT

The method includes the introduction of a feed flow into a first flask, the dynamic; expansion of the gaseous flow issuing from the flask in a turbine, then its introduction into a first purification column. It comprises the production at the head of the first column of a purified gas and the recovery at the bottom of the first column of a liquefied bottom gas, which is introduced, after expansion, into a second column for elimination of the $C_5^+$ hydrocarbons. The purified head natural gas issuing from the first column is heated in a first heat exchanger by thermal exchange with a feed gas. The method includes the compression of the gaseous head flow of the second column in a compressor before its introduction into a second separator flask.

26 Claims, 3 Drawing Sheets

(56) References Cited

U.S. PATENT DOCUMENTS

| | | | | |
|---|---|---|---|---|
| 2002/0166336 A1* | 11/2002 | Wilkinson | ............. | C07C 7/005 62/620 |
| 2003/0005722 A1* | 1/2003 | Wilkinson | ............. | F25J 1/0205 62/613 |
| 2003/0177786 A1* | 9/2003 | O'Brien | ................ | F25J 1/0022 62/620 |
| 2004/0250569 A1* | 12/2004 | Mak | ............................... | 62/625 |
| 2006/0144081 A1* | 7/2006 | Paradowski | .................... | 62/620 |
| 2010/0050688 A1* | 3/2010 | Ameringer | ..................... | 62/620 |
| 2010/0162753 A1* | 7/2010 | Bras | ...................... | F25J 3/0209 62/611 |

\* cited by examiner

METHOD OF PROCESSING A FEED NATURAL GAS TO OBTAIN A PROCESSED NATURAL GAS AND A CUT OF C5+ HYDROCARBONS, AND ASSOCIATED INSTALLATION

BACKGROUND OF THE INVENTION

The present invention concerns a method of processing a dried and decarbonated feed natural gas in order to obtain a natural gas intended to be liquefied and a cut of $C_5^+$ hydrocarbons, of the type comprising the following steps:
  cooling of the feed natural gas in a first heat exchanger to form a pre-cooled feed flow;
  introduction of the pre-cooled feed flow into a first separator flask to form a pre-cooled gaseous flow and optionally a pre-cooled liquid flow;
  dynamic expansion of the pre-cooled gaseous flow in an expansion turbine and introduction of the expanded flow issuing from the expansion turbine into a first purification column;
  optionally, expansion of the pre-cooled liquid flow and introduction into the first column;
  production at the head of the first column of a purified head natural gas;
  recovery at the bottom of the first column of a liquefied bottom natural gas;
  introduction of the liquefied bottom natural gas into a second column for elimination of the $C_5^+$ hydrocarbons;
  production, at the bottom of the second column, of the cut of $C_5^+$ hydrocarbons;
  production, at the head of the second column, of a gaseous column head flow and introduction of the gaseous column head flow into a second separator flask to form a liquid bottom flux and a gaseous head flux;
  introduction of a first part of the liquid bottom flux in reflux into the second column and introduction of a second part of the liquid bottom flux in reflux into the first column;
  injection of at least a part of the gaseous head flux issuing from the second separator flask into the purified head natural gas to form the processed natural gas.

Such a method is intended to be used in new natural gas processing units upstream of a liquefaction unit, or for modifying existing processing units in order to improve the safety thereof.

In particular, this method is adapted to the production of natural gas on floating platforms for production, storage and off-loading, designated by the acronym "FPSO" ("Floating Production Storage and Off-loading"). The FPSOs permit the production of natural gas from deep water fields, especially located in the bottom of expanses of water such as lakes, seas or oceans.

In order to facilitate the transport of natural gas extracted from a deposit, it is known to liquefy it in order to reduce its volume and permit its transport by ship. Before proceeding with liquefaction, the natural gas produced must be processed in order to eliminate a certain number of compounds.

In particular, the carbon dioxide content should be lowered to less than 50 ppm, the water content should be as low as possible and generally below 1 ppm and the content of sulphur-containing compounds, such as mercaptans, should be low. In particular, the concentration of hydrogen sulphide is generally fixed at less than 10 ppm and the concentration of other sulphur-containing compounds should be below 30 ppm.

In order to eliminate acid compounds, carbon dioxide and mercaptans, washing with a solvent such as an aqueous solution of amines is carried out. In order to eliminate water, molecular sieves are generally used.

In addition, the natural gas extracted generally contains a small amount of heavy hydrocarbon compounds, such as $C_5^+$ hydrocarbons like benzene.

The $C_5^+$ compounds must be eliminated from the natural gas before liquefaction in order not to cause blockages in the main gas liquefaction exchanger and in the equipment located downstream.

Conventionally, it is known for example to proceed with this elimination by cryogenic distillation. Such a distillation generally comprises steps of cooling of the feed gas in a series of exchangers using a propane type coolant and the feeding of a first fractionating column.

The method then comprises distillation in a column generally operating at a pressure of more than 40 bar, generally designated by the term "scrub column".

Then the head of the column is partially condensed in an exchanger using a more volatile coolant than propane, before using a cascade method, in a series of three columns, to produce a gaseous mixture rich in $C_2$, propane, butane and a cut of $C_5^+$ hydrocarbons.

Other processing methods are described for example in U.S. Pat. No. 7,010,937.

Such methods may be optimised thermally in order to obtain complete elimination of the $C_5^+$ hydrocarbons with good energy outputs.

However, these methods do not give complete satisfaction, particularly when they have to be carried out in a restricted space like that of a platform floating at sea, and/or in environments in which the safety constraints are high, such as, for example in urban areas.

In this respect, the use of hydrocarbon-containing coolants, such as propane or butane, and in particular the presence of storages for supplying these coolants, causes a safety problem, particularly taking into account their explosive nature.

SUMMARY OF THE INVENTION

It is therefore an object of the invention to obtain a method of processing a feed natural gas in order to eliminate the $C_5^+$ hydrocarbons therefrom, with a view to subsequent liquefaction, which is particularly compact and safe, in order in particular to allow it to be used on a floating platform or in sensitive environments.

To this end, the subject-matter of the invention is a method of the aforesaid type, characterized in that the method comprises the following steps:
  heating the purified head natural gas issuing from the first column in the first heat exchanger by heat exchange with the feed natural gas;
  expansion of the liquefied bottom natural gas issuing from the first column before its introduction into the second column;
  compression of the gaseous column head flow in a first compressor and cooling before its introduction into the second separator flask.

The method according to the invention may comprise one or more of the following features, taken singly or in any technically possible combination(s):
  during the step of dynamic expansion, the pre-cooled gaseous flow is expanded to a pressure of more than 35 bar, advantageously more than 40 bar, and more advantageously more than 44 bar;

the pressure prevailing in the second column is below 25 bar, advantageously below 20 bar, and more advantageously below 15 bar;

the temperature of the pre-cooled gaseous flow, after passing through the expansion turbine, is higher than the tapping-off temperature of the purified head natural gas at the head of the first column;

the method comprises bringing the second part of the liquid bottom flux into a heat exchange relationship in a second heat exchanger with the liquefied bottom natural gas issuing from the first column, the second heat exchanger contains only two fluxes;

the method comprises the tapping-off of a fraction of the gaseous head flux issuing from the second separator flask and the introduction of the tapped-off fraction into the second part of the liquid bottom flux issuing from the second separator flask;

the gaseous column head flow issuing from the second column is brought into a heat exchange relationship, after its compression in the first compressor, with the liquefied bottom natural gas issuing from the first column in a third heat exchanger;

the third heat exchanger contains only two fluxes;

the method comprises a step of tapping-off a secondary flux in the second part of the liquid bottom flux, before its introduction into the first column, and the introduction of the secondary flux into the purified head natural gas flow issuing from the first column;

the whole of the pre-cooled gaseous flow issuing from the first separator flask is introduced into the dynamic expansion turbine;

the number of theoretical stages of the first column is less than 4.

the feed natural gas is cooled exclusively by heat exchange with the purified head natural gas issuing from the first column without the supply of frigories from an external cooling cycle;

the steam pressure of the flow of $C_5^+$ hydrocarbons is below 1 bar, advantageously 0.8 bar or less;

the content of $C_4^-$ hydrocarbons in the flow rich in $C_5^+$ hydrocarbons is less than 10% molar, the content of $C_3^-$ hydrocarbons in the flow rich in $C_5^+$ hydrocarbons is less than 1% molar, the steam pressure of the flow of $C_5^+$ hydrocarbons is below 1 bar, advantageously 0.8 bar or less, the first heat exchanger contains only two fluxes.

The invention also has as its subject-matter an installation for processing a dried and decarbonated feed natural gas in order to obtain a processed natural gas intended to be liquefied and a cut of $C_5^+$ hydrocarbons, the installation being of the type comprising:

means for cooling the feed natural gas to form a pre-cooled feed flow comprising a first heat exchanger;

a first separator flask for forming a pre-cooled gaseous flow and optionally a pre-cooled liquid flow;

means for introducing the pre-cooled feed flow into the first separator flask;

a turbine for dynamic expansion of the pre-cooled gaseous flow;

a first purification column;

means for introducing the expanded flow issuing from the expansion turbine into the first column;

optionally, means for expansion and introduction into the first column of the pre-cooled liquid flow;

means for recovery at the head of the first column of a purified head natural gas;

means for recovery at the bottom of the first column of a liquefied bottom natural gas;

a second column for elimination of the $C_5^+$ hydrocarbons;

means for introducing the liquefied bottom natural gas into the second column;

means for recovery at the bottom of the second column of the cut of $C_5^+$ hydrocarbons;

means for recovery at the head of the second column of a gaseous column head flow;

a second separator flask;

means for introducing the gaseous column head flow into the second separator flask to form a liquid bottom flux and a gaseous head flux;

means for introducing a first part of the liquid bottom flux in reflux into the second column and means for introducing a second part of the liquid bottom flux in reflux into the first column;

means for injecting at least a part of the gaseous head flux issuing from the second separator flask into the purified head natural gas to form the processed natural gas flow;

characterized in that the installation comprises:

means for introducing the purified head natural gas issuing from the first column into the first heat exchanger to heat the purified head natural gas issuing from the first column in the first heat exchanger by heat exchange with the feed natural gas;

means for expansion of the liquefied bottom natural gas issuing from the first column before its introduction into the second column;

means for compressing the gaseous column head flow before its introduction into the second separator flask comprising a first compressor.

The installation according to the invention may comprise one or more of the following features, taken singly or in any technically possible combination(s):

the first heat exchanger contains only two fluxes;

the installation comprises a second heat exchanger suitable for bringing the liquefied bottom natural gas issuing from the first column into a heat exchange relationship with the second part of the liquid bottom flux issuing from the second separator flask;

the installation comprises means for tapping-off at least a part of the gaseous head flux issuing from the second separator flask in order to introduce it in a mixture in the second part of the liquid bottom flux issuing from the second separator flask;

the second heat exchanger contains only two fluxes;

the installation comprises a third heat exchanger suitable for placing in a heat exchange relationship the compressed gaseous head flow issuing from the second column and the liquefied bottom natural gas issuing from the first column;

the third heat exchanger contains only two fluxes;

the first heat exchanger, advantageously the second heat exchanger and the third head exchanger are of the bundle and calendar type and are made of steel;

the first column and the second column are equipped with structured packing beds;

the first separator flask, the second separator flask, and the bottoms of the first column and of the second column are equipped with baffles for preventing the oscillating movements of liquid.

The invention will become clearer from the following description, provided solely by way of example, and with reference to the appended drawings, in which:

DESCRIPTION OF PREFERRED EMBODIMENTS

In all that follows, the same reference will designate a flow circulating in a pipe, and the pipe which transports the flow.

In addition, unless indicated otherwise, the percentages quoted are molar percentages and the pressures are given in absolute bar.

Figure 1:
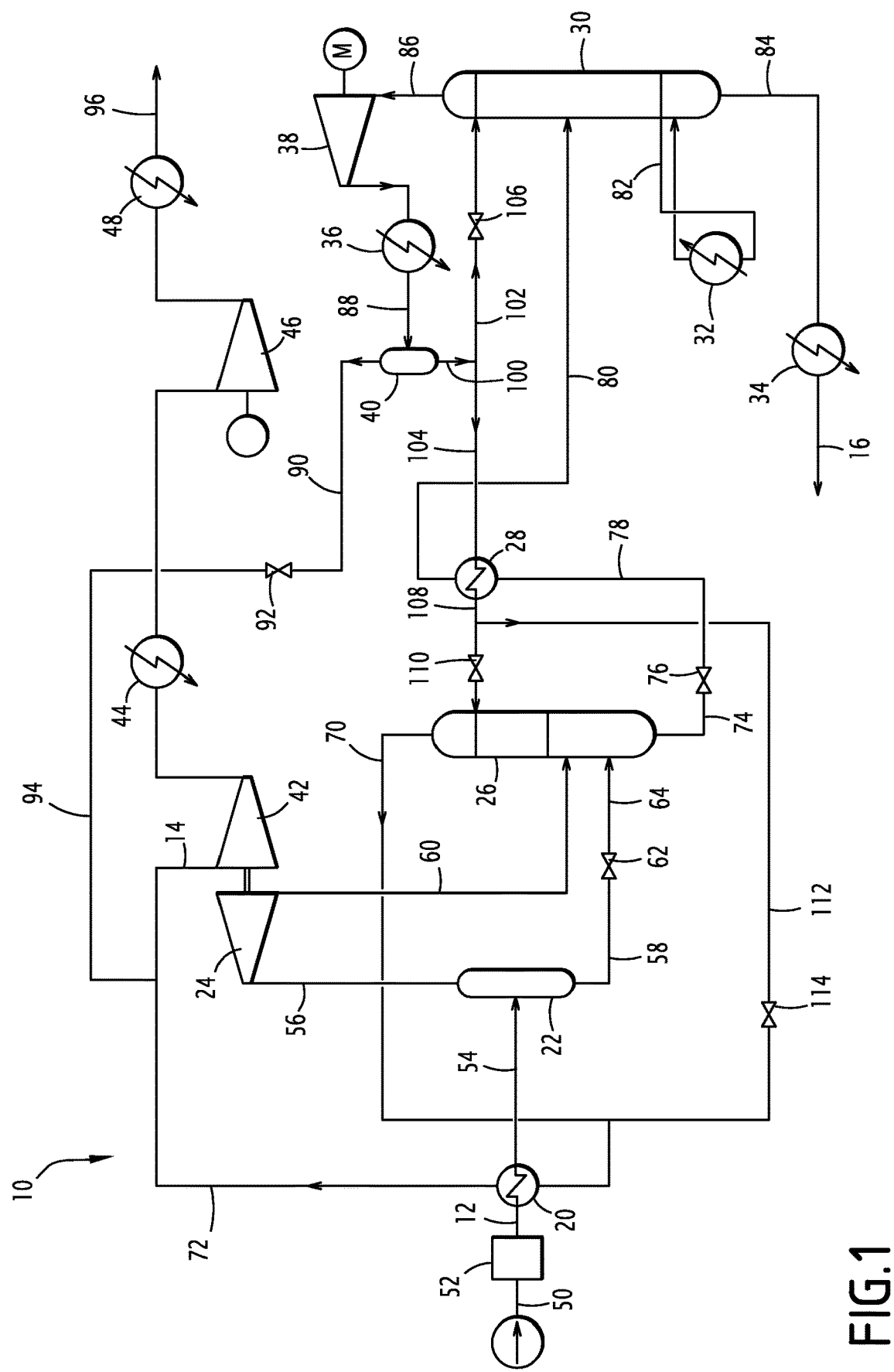
FIG. 1 is a functional block diagram of a first installation according to the invention, for the implementation of a first method according to the invention.

A first processing installation 10 according to the invention is shown in FIG. 1.

The installation 10 is intended to process a dried and decarbonated flow of feed natural gas 12 in order to eliminate the $C_5^+$ hydrocarbons therefrom. It makes it possible to produce a processed natural gas 14 intended to be compressed, then liquefied in a unit (not shown) for liquefaction of the natural gas, located downstream of the installation, and a cut 16 of $C_5^+$ hydrocarbons.

The installation 10 comprises, from upstream to downstream in FIG. 1, a first heat exchanger 20, a first separator flask 22, a dynamic expansion turbine 24 and a first purification column 26.

The installation 10 further comprises, downstream of the purification column 26, a second heat exchanger 28, and a second column 30 for recovery of the $C_5^+$ hydrocarbons, equipped with a reboiling exchanger 32.

The installation 10 comprises, downstream of the recovery column 30, a bottom heat exchanger 34 and a head heat exchanger 36 which is mounted downstream of the first compressor 38.

The installation 10 also comprises a second separator flask 40, a second compressor 42 coupled to the dynamic expansion turbine 24, a first downstream heat exchanger 44, a third compressor 46 and a second downstream heat exchanger 48.

According to the invention, the first column 26 has less than six stages, advantageously less than four theoretical fractionating stages in order to simplify its structure. It advantageously has two theoretical fractionating stages.

The flasks 22, 40 and the bottoms of the columns 26, 30 are equipped with baffles which make it possible to prevent oscillating movements of the liquid.

The columns 26 and 30 are moreover preferably equipped with structured packing beds. The structured packing beds are for example available from the Sulzer company under the name Mellapak. As will be seen hereinafter, and taking into account the thermal powers exchanged, the first heat exchanger and the second heat exchanger 28 may advantageously be produced on the basis of tube and calendar exchangers made of steel according to the standards of the association of manufacturers of tubular exchangers (TEMA). These exchangers are very robust. The heat exchange efficiency is improved by using tubes equipped with low fins.

A first processing method according to the invention will now be described.

In this example, the output of each compressor is 82% polytropic and the output of each turbine is 86% adiabatic.

The feed natural gas 12 is in this example a dried and decarbonated natural gas comprising in moles 5.00% nitrogen, 86.60% methane, 5.00% ethane, 1.50% propane, 0.50% $i\text{-}C_4$ hydrocarbons, 0.50% $n\text{-}C_4$ hydrocarbons, 0.20% $i\text{-}C_5$ hydrocarbons, 0.20% $n\text{-}C_5$ hydrocarbons, 0.20% $n\text{-}C_6$ hydrocarbons, 0.10% benzene and 0.20% $n\text{-}C_7$ hydrocarbons.

It therefore comprises more generally in cools moles between 0% and 15% nitrogen, between 0% and 5% $C_5^+$ hydrocarbons to be eliminated and between 80% and 95% $C_4$ hydrocarbons.

The dried and decarbonated gas 12 is obtained from a feed 50, after the passage of the feed 50 through a unit 52 for elimination of the impurities. The unit 52 processes the feed 50 to reduce the carbon dioxide content to less than 50 ppm, the hydrogen sulphide content to less than 10 ppm, and the content of other sulphur-containing compounds, such as mercaptans, below 30 ppm.

To this end, the elimination of the acid compounds, the carbon dioxide, the hydrogen sulphide, and light mercaptans is effected for example by washing with a solvent such as an aqueous solution of amine in the unit 52. The elimination of water is carried out for example by means of molecular sieves present in the unit 52 and which may also be used for absorbing mercaptans.

The feed natural gas 12 thus has a pressure of more than 45 bar and in particular approximately equal to 60 bar. It contains less than 50 ppm of carbon dioxide and less than 1 ppm of water.

The temperature of the natural gas on entry is close to ambient temperature and in particular is equal to 35° C.

In this example, the flow rate of the natural gas 12 is 40 000 kmols/hr.

The feed natural gas 12 is introduced into the first heat exchanger 20, there to be cooled to a temperature below 0° C., in particular approximately equal to −20° C. to form a pre-cooled feed flow 54.

The flow 54 is introduced into the first separator flask 22 to form, at the head, a pre-cooled gaseous flow 56 and optionally, at the bottom, a pre-cooled liquid flow 58.

The pre-cooled gaseous flow 56 is then introduced into the turbine 24, there to be expanded dynamically to a pressure of more than 35 bar, advantageously more than 40 bar, even more advantageously more than 44 bar, and to form an upper column supply flow 60. In this example the pressure of the flow 60 is 45 bar, which corresponds approximately to the pressure of the column 26.

The flow 60 has a temperature below −25° C. and in particular approximately equal to −35.4° C. It is introduced into the first fractionating column 26 below the active fractionating zone.

The pre-cooled liquid flow 58, when it is present, is expanded via a first static expansion valve 62 to a pressure of more than 35 bar, advantageously more than 40 bar, and more advantageously more than 45 bar to form a column supply lower flow 64.

The temperature of the column supply lower flow 64 is below −20° C. and is approximately equal to −23° C.

The column supply lower flow 64 is introduced into the first fractionating column 26 below the column supply upper flow 60.

A purified head natural gas 70, low in $C_5^+$ hydrocarbons, is produced and tapped-off at the head of the column 26. The gas 70 has a temperature below −25° C., and in particular equal to −36.3° C.

The gas 70 comprises a methane content of more than 85% and a $C_5^+$ hydrocarbon content of less than 0.1%.

The purified head natural gas 70 is then introduced into the first heat exchanger 20, where it is placed in a heat exchange relationship with the feed natural gas 12. The purified gas 70 cools the feed natural gas 12 and is heated to a temperature slightly below ambient temperature and in particular substantially equal to 30° C., thus forming a heated head flow 72.

Thus, according to the invention, the feed natural gas 12 is cooled exclusively by heat exchange with the purified head natural gas 70, without it being necessary to provide additional frigories by an external cooling cycle. This makes it possible to simplify significantly the structure of the installation 10 and the implementation of the method.

The column 26 produces at the bottom a liquefied bottom gas 74, rich in $C_5^+$ hydrocarbons. The liquefied gas 74 comprises a high content of $C_5^+$ hydrocarbons which corresponds to more than 90% of the $C_5^+$ hydrocarbons present in the feed natural gas 12. This cut is in general designated under the name of NGL "Natural Gas Liquid".

The liquefied bottom gas 74 tapped-off in the bottom of the column 26 is then expanded in a second static expansion valve 76 to a pressure below 25 bar, advantageously below 20 bar, and more advantageously below 15 bar, to form an expanded liquefied bottom gas 78.

The liquefied gas 78 is then introduced into the second heat exchanger 28, there to be heated to a temperature above −20° C., advantageously approximately equal to −19° C. and to give a heated liquefied gas 80.

The heated liquefied natural gas 80 is then introduced at an intermediate supply level of the second column 30.

A reboiling flow 82 is tapped-off in the bottom of the second column 30 below the intermediate supply level and is reintroduced into the column 30 after passing through the reboiling exchanger 32 where it heats up.

A bottom flow 84 is tapped-off at the bottom of the second column 30, then introduced into the bottom heat exchanger 34 to form, after heating to ambient temperature, the cut 16 of $C_5^+$ hydrocarbons.

The cut 16 has a flow rate which depends on the content of $C_5^+$ hydrocarbons in the feed gas 12. In this example, the flow rate is around 29 800 kg/hr. It has a steam pressure below 1 bar, advantageously below 0.8 bar and a content of $C_5^+$ hydrocarbons of more than 89% in moles.

The molar content of $C_4^-$ hydrocarbons in the cut 16 is less than 10% and the molar content of $C_3^-$ hydrocarbons in the cut 16 is less than 1%.

A gaseous column head flow 86 is extracted from the head of the column 30. The flow 86 is compressed in the first compressor 38 to a pressure of more than 40 bar and in particular equal to 45.7 bar.

The compressed flow is then cooled in the head heat exchanger 36 by heat exchange with a coolant to a temperature of around 35° C. to form a cooled compressed head flow 88.

The flow 88 is then introduced into the second separator flask 40. The second separator flask 40 produces a gaseous head flux 90 which is conveyed to a third static expansion valve 92 and, after passing through the valve 92, forms an expanded head flux 94.

The pressure of the expanded head flux 94 is approximately equal to the pressure of the first fractionating column 26 and its flow rate is around 15760 kg/hr.

The expanded head flux 94 is then injected into the heated head flow 72 to form the processed natural gas 14.

The processed natural gas 14 is then introduced in succession into the first downstream compressor 42, the first downstream heat exchanger 44, the second downstream compressor 46, and finally the second downstream heat exchanger 48 in order to obtain a compressed processed gas 96 intended to be liquefied.

The compressed processed gas 96 then has a pressure of more than 60 bar, in particular approximately equal to 75 bar and a temperature approximately equal to the temperature of the coolant circulating in the second downstream heat exchanger 48, that is, around 40° C.

The compressed processed gas 96 is sent to a unit for liquefaction of the natural gas (not shown) to form, after total liquefaction, liquefied natural gas suitable for being transported.

A liquid bottom flux 100 is recovered at the bottom of the second separator flask 40. The liquid flux 100 is separated into a first part 102 forming a reflux of the second column 30 and into a second part 104 forming a reflux of the first column 26.

The ratio of the mass flow rate of the first part 102 to the mass flow rate of the second part 104 is advantageously between 30% and 90%.

The first part 102 is expanded in a fourth expansion valve 106 to a pressure below 25 bar, advantageously below 20 bar, and more advantageously below 15 bar, in order to be introduced as a reflux in the region of the head of the second column 30. The temperature of the second part 102 after expansion in the valve 106 is below 15° C. and in particular equal to 9.7° C.

The second part 104 is conveyed to the second heat exchanger 28, there to be placed in a heat exchange relationship with the liquefied bottom natural gas 78 of the fractionating column 26. The second part 104 heats the liquefied bottom natural gas 78 and forms a second cooled part 108.

The second cooled part 108, which has a temperature below 30° C., and in particular equal to −35° C., is then introduced into the first column 26, after expansion in a fifth expansion valve 110 to the pressure of the first fractionating column 26.

A secondary flux 112 is tapped-off in the second cooled reflux part 108, after its passage through the second exchanger 28 and before its passage through the fifth expansion valve 108. The ratio of the mass flow rate of the secondary flux 112 to the total flux of the second cooled reflux part 108 is below 10%.

The secondary flux 112 is then expanded in a sixth expansion valve 114 to a pressure approximately equal to the pressure of the first fractionating column 26 in order to be mixed with the head natural gas 70 issuing from the first column 26 before its passage through the first exchanger 20.

By way of illustration, the molar composition of the liquefied bottom natural gas 74, the compositions of the gaseous head flux 90 and of the liquid bottom flux 100, and the composition of the processed gas 14 are given in Table 1.

TABLE 1

| Flux (molar %) | 74 | 90 | 100 | 14 |
|---|---|---|---|---|
| Nitrogen | 0.38 | 0.89 | 0.12 | 5.05 |
| Methane | 31.34 | 63.28 | 18.41 | 87.40 |
| Ethane | 12.39 | 16.54 | 15.36 | 5.05 |
| Propane | 12.77 | 10.15 | 22.39 | 1.51 |
| i-C4 | 9.07 | 4.45 | 18.28 | 0.50 |
| n-C4 | 11.95 | 4.47 | 23.22 | 0.46 |
| i-C5 | 5.01 | 0.14 | 1.43 | 194 ppm |
| n-C5 | 4.96 | 0.07 | 0.80 | 98 ppm |
| n-C6 | 4.85 | — | 0.01 | 2 ppm |
| Benzene | 2.42 | — | — | 1 ppm |
| n-C7 | 4.85 | — | — | 0 ppm |

Examples of temperature, pressure and mass flow rate of the different flows illustrated in the method of FIG. 1 are summarised in Table 2 below.

TABLE 2

| Flow | Pressure (bar) | Temperatures (° C.) | Flow rate (kg/h) |
|---|---|---|---|
| 12 | 60 | 35 | 751179 |
| 54 | 60 | −20 | 751179 |
| 60 | 45 | −35.4 | 708045 |
| 64 | 45 | −23 | 43134 |
| 70 | 44.8 | −36.3 | 704487 |
| 14 | 44.3 | 30.2 | 721380 |
| 96 | 75 | 35 | 721380 |
| 80 | 11.5 | −19 | 73913 |
| 16 | 10.6 | 35 | 29799 |
| 88 | 45.4 | 35 | 57941 |
| 94 | 45.3 | 35 | 15760 |
| 102 | 45.4 | 35 | 13830 |
| 108 | 45.2 | −35 | 28360 |
| 112 | 45.2 | −35 | 1140 |

The energy consumption of the method is given in Table 3.

TABLE 3

| Compressor 38 | 1.91 MW |
|---|---|
| Compressor 46 | 13.62 MW |
| Total | 15.53 MW |
| Exchanger 32 | 9.05 MW |

Figure 2:
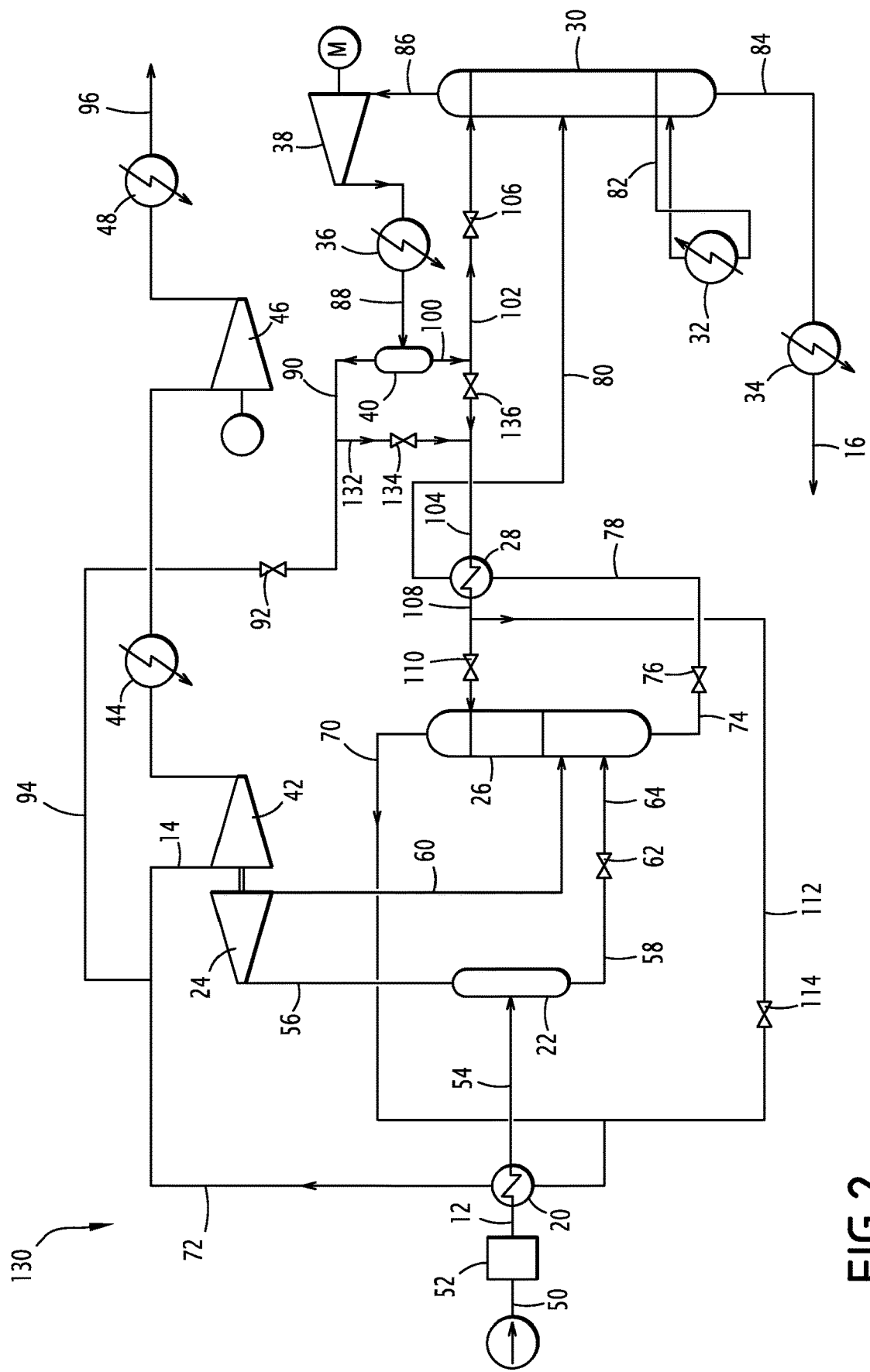
FIG. 2 is a view similar to FIG. 1 of a second installation according to the invention for the implementation of a second method according to the invention.

A second installation 130 according to the invention is shown in FIG. 2. The installation 130 is intended for the implementation of a second method according to the invention.

The second method according to the invention differs from the first method in that a branch fraction 132 is tapped-off in the gaseous head flux 90.

The branch fraction 132 is introduced, after passing through a seventh control valve 134, into the second part 104, downstream of an eighth control valve 136, and upstream of the second exchanger 28.

The ratio of the mass flow rate of the branch fraction 132 to the total flow rate of the gaseous head flux 90 issuing from the second separator flask 40 is less than 10%.

By way of illustration, the molar composition of the liquefied bottom natural gas 74, the compositions of the gaseous head flux 90 and the liquid bottom flux 100, and the composition of the processed gas 14 are given in Table 4.

TABLE 4

| Flux (molar %) | 74 | 90 | 100 | 14 |
|---|---|---|---|---|
| Nitrogen | 0.43 | 0.97 | 0.14 | 5.05 |
| Methane | 32.58 | 64.23 | 19.46 | 87.40 |
| Ethane | 12.36 | 16.06 | 15.28 | 5.05 |
| Propane | 12.59 | 9.76 | 21.82 | 1.51 |
| i-C4 | 8.99 | 4.34 | 17.87 | 0.50 |
| n-C4 | 11.92 | 4.40 | 22.90 | 0.46 |
| i-C5 | 4.85 | 0.16 | 1.60 | 204 ppm |
| n-C5 | 4.77 | 0.08 | 0.93 | 104 ppm |
| n-C6 | 4.60 | — | 0.01 | 2 ppm |
| Benzene | 2.30 | — | — | 1 ppm |
| n-C7 | 4.60 | — | — | 0 ppm |

Examples of temperature, pressure and mass flow rate of the different flows illustrated in the method of FIG. 2 are summarised in Table 5 below.

TABLE 5

| Flow | Pressure (bar) | Temperature (° C.) | Flow rate (kg/h) |
|---|---|---|---|
| 12 | 60 | 35 | 751179 |
| 54 | 60 | −21 | 751179 |
| 60 | 47 | −34.1 | 706827 |
| 64 | 47 | −23.6 | 44352 |
| 70 | 46.8 | −35.4 | 708442 |
| 14 | 46.3 | 31.3 | 721430 |
| 96 | 75 | 36 | 721430 |
| 80 | 11.5 | −10.6 | 76608 |
| 16 | 10.6 | 35 | 29750 |
| 88 | 47.4 | 35 | 60585 |
| 94 | 47.3 | 35 | 11690 |
| 102 | 47.4 | 35 | 13730 |
| 108 | 47.2 | −35 | 35165 |
| 112 | 47.2 | −35 | 1290 |
| 132 | 47.4 | 35 | 4990 |

The energy consumption of the method is given in Table 6 below.

TABLE 6

| Compressor 38 | 2.09 MW |
|---|---|
| Compressor 46 | 12.75 MW |
| Total | 14.84 MW |
| Exchanger 32 | 8.7 MW |

The composition of the reflux 104 of the first column 26, enriched in light gases by the addition of the branch fraction 132, leads to vaporisation of these column 26 head gases, thereby lowering the temperature of the head of the column 26. Thus the column head temperature is lower than the upper flow temperature 60.

Figure 3:
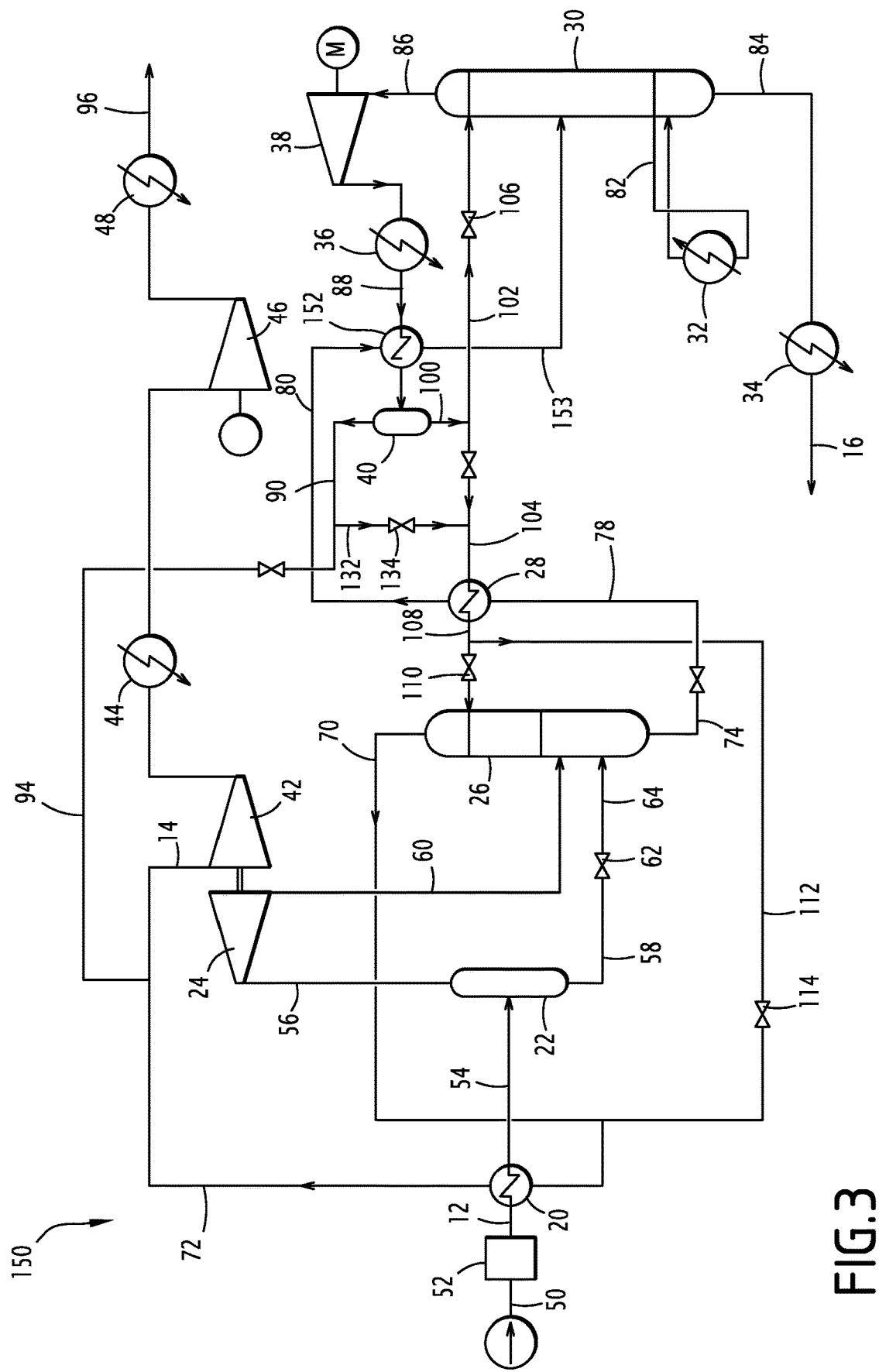
FIG. 3 is a view similar to FIG. 1 of a third installation according to the invention for the implementation of a third method according to the invention.

A third installation 150 according to the invention is shown in FIG. 3. The third installation 150 is intended for the implementation of a third method according to the invention.

Differing from the second installation 130, the third installation 150 comprises a third heat exchanger 152 arranged downstream of the second heat exchanger 28.

The third method according to the invention differs from the second method according to the invention in that the heated liquefied natural gas 80 is introduced into the third exchanger 152 downstream of the second exchanger 28, there to be heated before its introduction into the second recovery column 30.

The temperature of the liquefied natural gas 153 issuing from the third exchanger 152 is thus above 15° C., and in particular equal to 10° C.

The compressed head flow 88 is also introduced into the third heat exchanger 152, there to be cooled by heat exchange with the liquefied natural gas 80 to a temperature below 0° C., and in particular equal to −3.4° C.

The functioning of the third method is otherwise identical to that of the second method.

By way of illustration, the molar composition of the liquefied bottom natural gas 74, the compositions of the gaseous head flux 90 and of the liquid bottom flux 100, and the composition of the processed gas 14 are given in table 7.

TABLE 7

| Flux (molar %) | 74 | 90 | 100 | 14 |
|---|---|---|---|---|
| Nitrogen | 0.44 | 1.59 | 0.21 | 5.05 |
| Methane | 33.00 | 80.54 | 28.19 | 87.40 |
| Ethane | 12.27 | 10.91 | 17.11 | 5.05 |
| Propane | 12.49 | 4.19 | 19.84 | 1.51 |
| i-C4 | 9.01 | 1.43 | 14.71 | 0.50 |
| n-C4 | 11.98 | 1.30 | 18.35 | 0.46 |
| i-C5 | 4.75 | 0.03 | 1.06 | 192 ppm |
| n-C5 | 4.66 | 0.01 | 0.53 | 93 ppm |
| n-C6 | 4.55 | — | — | 2 ppm |
| Benzene | 2.28 | — | — | 1 ppm |
| n-C7 | 4.56 | — | — | 0 ppm |

Examples of temperature, pressure and mass flow rate of the different flows illustrated in the method of FIG. 3 are summarised in Table 8 below.

TABLE 8

| Flow | Pressure (bar) | Temperature (° C.) | Flow rate (kg/h) |
|---|---|---|---|
| 12 | 60 | 35 | 751179 |
| 54 | 60 | −21 | 751179 |
| 60 | 48 | −33 | 706827 |
| 64 | 48 | −23.4 | 44352 |
| 70 | 47.8 | −34.8 | 713145 |
| 14 | 47.5 | 30.3 | 721360 |
| 96 | 74.5 | 35 | 721360 |
| 80 | 11.5 | −25 | 77047 |
| 16 | 10.6 | 35 | 29820 |
| 88 | 48.7 | −3.4 | 62766 |
| 94 | 48 | −3.4 | 4200 |
| 102 | 48.1 | −3.4 | 15540 |
| 108 | 47.9 | −34.2 | 43026 |
| 112 | 47.9 | −34.2 | 4010 |
| 132 | 48.1 | −3.4 | 3020 |
| 153 | 11.5 | 10 | 77047 |

The energy consumption of the method is given in table 9 below.

TABLE 9

| Compressor 38 | 2.24 MW |
|---|---|
| Compressor 46 | 12.29 MW |
| Total | 14.53 MW |
| Exchanger 32 | 7.7 MW |

By means of the invention described above, it is possible to produce a processed gas 14 which can be liquefied, with a very small number of items of equipment and with an improved output.

Thus, the installations 10, 130, 150 according to the invention and described above, are for example arranged on the ground or advantageously on a floating structure or on a structure fixed at the water surface, such as a platform or a floating unit for recovery, storage and processing of hydrocarbons, designated by the acronym "FPSO".

The frigories necessary for the implementation of the method are obtained exclusively by the dynamic expansion of the flow 56 in the turbine 24 and by the heat exchange between the purified head gas 70 and the feed natural gas 12.

The absence of external cooling cycles makes it possible to have a relatively small inventory of liquid, limited to the bottoms of the flasks 22, 44 and of the columns 26, 30.

In addition, the purification column 26 has few fractionating stages, and a structured padding. It is therefore easy to put into operation on a floating platform.

The installation is moreover devoid of pumps and employs simple fluid exchangers that can be of the steel tube and calendar type.

The cooling of the method, provided approximately exclusively by the expansion turbine 24 without the application of external cold, makes it possible to start up the process more rapidly and gradually.

In addition, during the start-up phase, the processed gas 14 may be recycled towards the feed gas in order to limit or avoid flaring.

The method is moreover very flexible, since it makes it possible to obtain a processed gas 14 in which the benzene content is approximately equal to 1 ppm and in which the $C_5^+$ content is below 0.1% molar based on feed gas having a very variable content of $C_4^-$ as illustrated in Table 10 below.

TABLE 10

| Gas | | 1 | 2 | 3 | 4 | 5 |
|---|---|---|---|---|---|---|
| $C_4^+$ content of feed gas 12 | mols % | 3.4 | 3.28 | 1.9 | 1.44 | 0.78 |
| Pre-cooling temperature of feed gas in exchanger 20 | ° C. | −2.1 | −20.4 | −36.1 | −44 | −57 |
| Pressure of column 26 | bar | 46.8 | 49.8 | 49.8 | 49.8 | 48.8 |
| Power of turbine 24 | kW | 3452 | 2576 | 2271 | 1988 | 1924 |
| Flow rate of $C_5^+$ cut produced | kg/h | 29750 | 14019 | 7892 | 862 | 5553 |

It will be noted that heat exchangers 20, 28 and 152 contain only two fluxes.

As a consequence, heat exchanger 28 is able to place the liquefied gas 78 in heat exchange relationship exclusively with the second part 104 forming reflux of the first column 26.

Heat exchanger 20 is able to place the feed natural gas 12 in heat exchange relationship exclusively with the purified head natural gas 70.

Heat exchanger 152 is able to place the heated liquefied natural gas 80 in heat exchange relationship exclusively with the cooled compressed head flow 88.

What is claimed is:

1. A method of processing a dried and decarbonated feed natural gas in order to obtain a processed natural gas intended to be liquefied and a cut of $C_5^+$ hydrocarbons, the method comprising the following steps:
   cooling of the feed natural gas in a first heat exchanger to form a pre-cooled feed flow;
   introduction of the pre-cooled feed flow into a first separator flask to form a pre-cooled gaseous flow;
   dynamic expansion of the pre-cooled gaseous flow in an expansion turbine and introduction of the expanded flow issuing from the expansion turbine into a first purification column;

production at the head of the first column of a purified head natural gas;

recovery at the bottom of the first column of a liquefied bottom natural gas;

introduction of the liquefied bottom natural gas into a second column for elimination of the $C_5^+$ hydrocarbons;

production, at the bottom of the second column, of the cut of $C_5^+$ hydrocarbons;

production, at the head of the second column, of a gaseous column head flow and introduction of the gaseous column head flow into a second separator flask to form a liquid bottom flux and a gaseous head flux;

introduction of a first part of the liquid bottom flux in reflux into the second column and introduction of a second part of the liquid bottom flux in reflux into the first column;

injection of at least a part of the gaseous head flux issuing from the second separator flask into the purified head natural gas to form the processed natural gas, expansion of the liquefied bottom natural gas issuing from the first column before its introduction into the second column, and compression of the gaseous column head flow in a first compressor and cooling before its introduction into the second separator flask, wherein during the step of dynamic expansion, the pre-cooled gaseous flow is expanded to a pressure of more than 35 bar, wherein the step of cooling of the feed natural gas in the first heat exchanger is performed by exchanging heat in the first heat exchanger exclusively with the purified head natural gas issuing from the first column, whereby the purified head natural gas issuing from the first column is heated in the first heat exchanger by heat exchange with the feed natural gas, and wherein the pressure prevailing in the second column is below 25 bar, the purified head natural gas is introduced into the first heat exchanger: (1) without the purified head natural gas entering into heat exchange in a heat exchanger with a flow introduced into the first column and (2) without the purified head natural gas entering into heat exchange in a heat exchanger with a flow introduced into the second column, the purified head natural gas enters into heat exchange in a heat exchanger exclusively with the feed natural gas in the first heat exchanger, the feed natural gas is cooled down exclusively by the purified head natural gas, without being cooled down by an external refrigeration cycle, and the molar content of $C_3^-$ hydrocarbons in the cut of $C_5^+$, hydrocarbons is less than 1%.

2. The method according to claim 1, wherein the temperature of the pre-cooled gaseous flow, after passing through the expansion turbine, is higher than the tapping-off temperature of the purified head natural gas at the head of the first column.

3. The method according to claim 1, wherein the method further comprises bringing the second part of the liquid bottom flux into a heat exchange relationship in a second heat exchanger with the liquefied bottom natural gas issuing from the first column, the second heat exchanger containing only two fluxes.

4. The method according to claim 1, wherein the method further comprises the tapping-off of a fraction of the gaseous head flux issuing from the second separator flask and the introduction of the tapped-off fraction into the second part of the liquid bottom flux issuing from the second separator flask.

5. The method according to claim 1, wherein the gaseous column head flow issuing from the second column is brought into a heat exchange relationship, after compression of the gaseous column head flow in the first compressor, with the liquefied bottom natural gas issuing from the first column in a third heat exchanger, the third heat exchanger containing only two fluxes.

6. The method according to claim 1, wherein the method further comprises a step of tapping-off a secondary flux in the second part of the liquid bottom flux, before its introduction into the first column, and the introduction of the secondary flux into the flow of purified head natural gas issuing from the first column.

7. The method according to claim 1, wherein the whole of the pre-cooled gaseous flow issuing from the first separator flask is introduced into the dynamic expansion turbine.

8. The method according to any one of the preceding claims, wherein the number of theoretical stages of the first column is less than 4.

9. The method according to claim 1, wherein the feed natural gas is cooled exclusively by heat exchange with the purified head natural gas issuing from the first column without the addition of frigories from an external cooling cycle.

10. The method according to claim 1, wherein the steam pressure of the flow of $C_5^+$ hydrocarbons is below 1 bar.

11. The method according to claim 1, wherein the first heat exchanger contains only two fluxes.

12. An installation for processing a dried and decarbonated feed natural gas to obtain a processed natural gas intended to be liquefied and a cut of $C_5^+$ hydrocarbons, the installation comprising:

a cooler for cooling the feed natural gas to form a pre-cooled feed flow, comprising a first heat exchanger;

a first separator flask for forming a pre-cooled gaseous flow;

a device for introducing the pre-cooled feed flow into the first separator flask;

a dynamic expansion turbine for dynamic expansion of the pre-cooled gaseous flow;

a first purification column;

a device for introducing the expanded flow issuing from the dynamic expansion turbine into the first column;

a device for recovery at the head of the first column of a purified head natural gas;

a device for recovery at the bottom of the first column of a liquefied bottom natural gas;

a second column for elimination of the $C_5^+$ hydrocarbons;

a device for introducing the liquefied bottom natural gas into the second column;

a device for recovery at the bottom of the second column of the cut of $C_5^+$ hydrocarbons;

a device for recovery at the head of the second column of a gaseous column head flow;

a second separator flask;

a device for introducing the gaseous column head flow into the second separator flask to form a liquid bottom flux and a gaseous head flux;

a device for introducing a first part of the liquid bottom flux in reflux into the second column and a device for introducing a second part of the liquid bottom flux in reflux into the first column;

an injector for injecting at least a part of the gaseous head flux issuing from the second separator flask into the purified head natural gas to form a flow of the processed natural gas;

a device for introducing the purified head natural gas issuing from the first column into the first heat exchanger to heat the purified head natural gas issuing from the first column in the first heat exchanger by heat exchange with the feed natural gas;

an expansion valve for expansion of the liquefied bottom natural gas issuing from the first column before its introduction into the second column; and a first compressor for compressing the gaseous column head flow before its introduction into the second separator flask, wherein the dynamic expansion turbine is able to expand the pre-cooled gaseous flow to a pressure of more than 35 bars, the pressure prevailing in the second column is below 25 bars, the installation is configured to introduce the purified head natural gas into the first heat exchanger: (1) without the purified head natural gas entering into heat exchange with a flow introduced into the first column and (2) without the purified head natural gas entering into heat exchange in a heat exchanger with a flow introduced into the second column, the first heat exchanger exclusively exchanges heat between the purified head natural gas and the feed natural gas to exclusively cool the feed natural gas, the feed natural gas being exclusively cooled by the purified head natural gas, without being cooled by an external refrigeration cycle, and the cut of $C_5^+$ hydrocarbons recovered at the bottom of the second column has a molar content of $C_3^-$ hydrocarbons of less than 1%.

13. The installation according to claim 12, wherein the installation further comprises a second heat exchanger suitable for bringing the liquefied bottom natural gas issuing from the first column into a heat exchange relationship with the second part of the liquid bottom flux issuing from the second separator flask, the second heat exchanger containing only two fluxes.

14. The installation according to claim 12, wherein the installation further comprises a device for tapping-off at least a part of the gaseous head flux issuing from the second separator flask in order to introduce it in a mixture in the second part of the liquid bottom flux issuing from the second separator flask.

15. The installation according to claim 12, wherein the installation further comprises a third heat exchanger suitable for bringing into a heat exchange relationship the compressed gaseous head flow issuing from the second column and the liquefied bottom natural gas issuing from the first column, the third heat exchanger containing only two fluxes.

16. The method according to claim 1, wherein the method further comprises forming a pre-cooled liquid flow with the pre-cooled gaseous flow, and expansion of the pre-cooled liquid flow and introduction of the expanded pre-cooled liquid into the first purification column.

17. The installation according to claim 12, wherein the first separator flask forms a pre-cooled liquid flow, and the installation further comprises an expander that expands the pre-cooled liquid flow and introduces the expanded pre-cooled liquid into the first column.

18. The method according to claim 1, wherein, during the step of dynamic expansion, the pre-cooled gaseous flow is expanded to a pressure of more than 40 bar.

19. The method according to claim 1, wherein during the step of dynamic expansion, the pre-cooled gaseous flow is expanded to a pressure of more than 44 bar.

20. The method according to claim 1, wherein the pressure prevailing in the second column is below 20 bar.

21. The method according to claim 1, wherein the pressure prevailing in the second column is below 15 bar.

22. The installation according to claim 12, wherein the turbine for dynamic expansion of the pre-cooled gaseous flow is able to expand the pre-cooled gaseous flow to a pressure of more than 40 bar.

23. The installation according to claim 12, wherein the turbine for dynamic expansion of the pre-cooled gaseous flow is able to expand the pre-cooled gaseous flow to a pressure of more than 44 bar.

24. The installation according to claim 12, wherein the pressure prevailing in the second column is below 20 bar.

25. The installation according to claim 12, wherein the pressure prevailing in the second column is below 15 bar.

26. A method of processing a dried and decarbonated feed natural gas in order to obtain a processed natural gas intended to be liquefied and a cut of $C_5^+$ hydrocarbons, the method comprising the following steps:

cooling of the feed natural gas in a first heat exchanger to form a pre-cooled feed flow;

introduction of the pre-cooled feed flow into a first separator flask to form a pre-cooled gaseous flow;

dynamic expansion of the pre-cooled gaseous flow in an expansion turbine and introduction of the expanded flow issuing from the expansion turbine into a first purification column;

production at the head of the first column of a purified head natural gas;

recovery at the bottom of the first column of a liquefied bottom natural gas;

introduction of the liquefied bottom natural gas into a second column for elimination of the $C_5^+$ hydrocarbons;

production, at the bottom of the second column, of the cut of $C_5^+$ hydrocarbons;

production, at the head of the second column, of a gaseous column head flow and introduction of the gaseous column head flow into a second separator flask to form a liquid bottom flux and a gaseous head flux;

introduction of a first part of the liquid bottom flux in reflux into the second column and introduction of a second part of the liquid bottom flux in reflux into the first column;

injection of at least a part of the gaseous head flux issuing from the second separator flask into the purified head natural gas to form the processed natural gas, expansion of the liquefied bottom natural gas issuing from the first column before its introduction into the second column, and compression of the gaseous column head flow in a first compressor and cooling before its introduction into the second separator flask, wherein during the step of dynamic expansion, the pre-cooled gaseous flow is expanded to a pressure of more than 35 bar, wherein the step of cooling of the feed natural gas in the first heat exchanger is performed by exchanging heat in the first heat exchanger exclusively with the purified head natural gas issuing from the first column, whereby the purified head natural gas issuing from the first column is heated in the first heat exchanger by heat exchange with the feed natural gas, wherein the pressure prevailing in the second column is below 25 bar, the purified head natural gas is introduced into the first heat exchanger without the purified head natural gas entering into heat exchange in a heat exchanger with a flow introduced into the first column, the purified head natural gas enters into heat exchange in a heat exchanger exclusively with the feed natural gas in the first heat exchanger, the feed natural gas is cooled down exclusively by the purified head natural gas, without being cooled down by an external refrigeration cycle, and the molar content of $C_3^-$ hydrocarbons in the cut of $C_5^+$ hydrocarbons is less than 1%, and wherein the method further comprises a step of tapping-off a secondary flux in the second part of the liquid bottom flux, before its introduction into the first column, and the introduction of the secondary flux into the flow of purified head natural gas issuing from the first column.

* * * * *